United States Patent [19]

White et al.

[11] 4,279,673

[45] Jul. 21, 1981

[54] HARD-EDGE WALLBOARD

[75] Inventors: George H. White; Donald J. Petersen, both of North Tonawanda, N.Y.

[73] Assignee: National Gypsum Company, Dallas, Tex.

[21] Appl. No.: 120,566

[22] Filed: Feb. 11, 1980

[51] Int. Cl.³ .................... B32B 13/00; B05D 5/00; B32B 3/26
[52] U.S. Cl. ................................ 156/39; 427/284; 428/305
[58] Field of Search .............. 156/39, 43, 44, 45; 428/304, 305; 427/284, 285, 326

[56] References Cited

U.S. PATENT DOCUMENTS

| 2,762,738 | 9/1956 | Teale | 156/39 |
| 2,985,219 | 5/1961 | Summerfield | 156/39 |

Primary Examiner—David A. Simmons
Assistant Examiner—L. Falasco
Attorney, Agent, or Firm—Robert F. Hause

[57] ABSTRACT

A method of making gypsum wallboard in which a portion of the conventional foamed gypsum slurry for forming the wallboard core is fed through a relatively low speed agitator wherein a defoaming agent is thoroughly admixed therewith, and this portion of the slurry is then disposed along the edge portion of the wallboard being formed, whereby a hard-edge wallboard is produced using less energy than used with prior methods for making a hard-edge wallboard.

5 Claims, 4 Drawing Figures

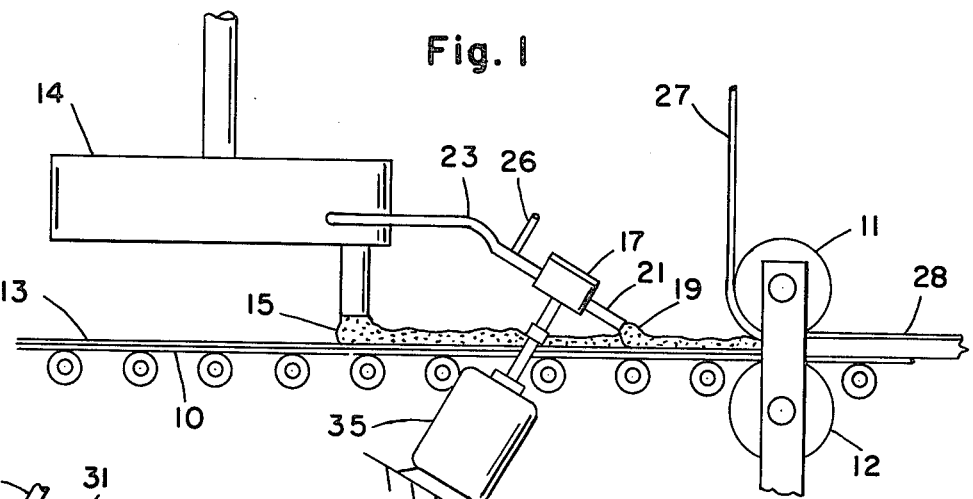
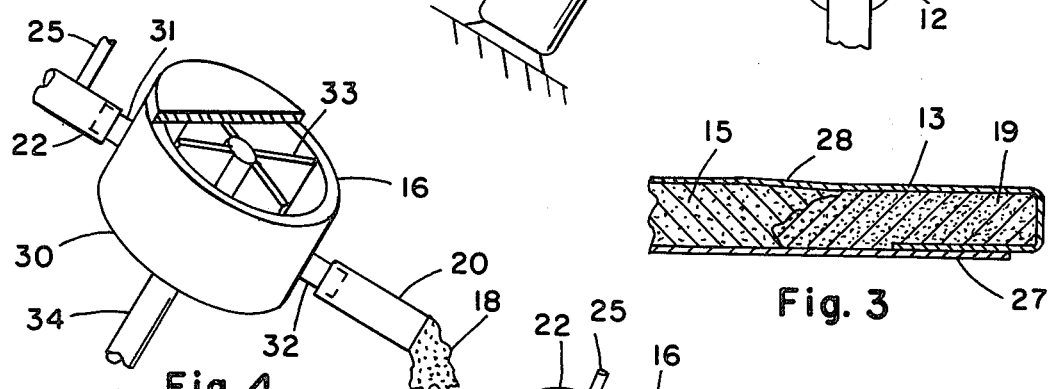
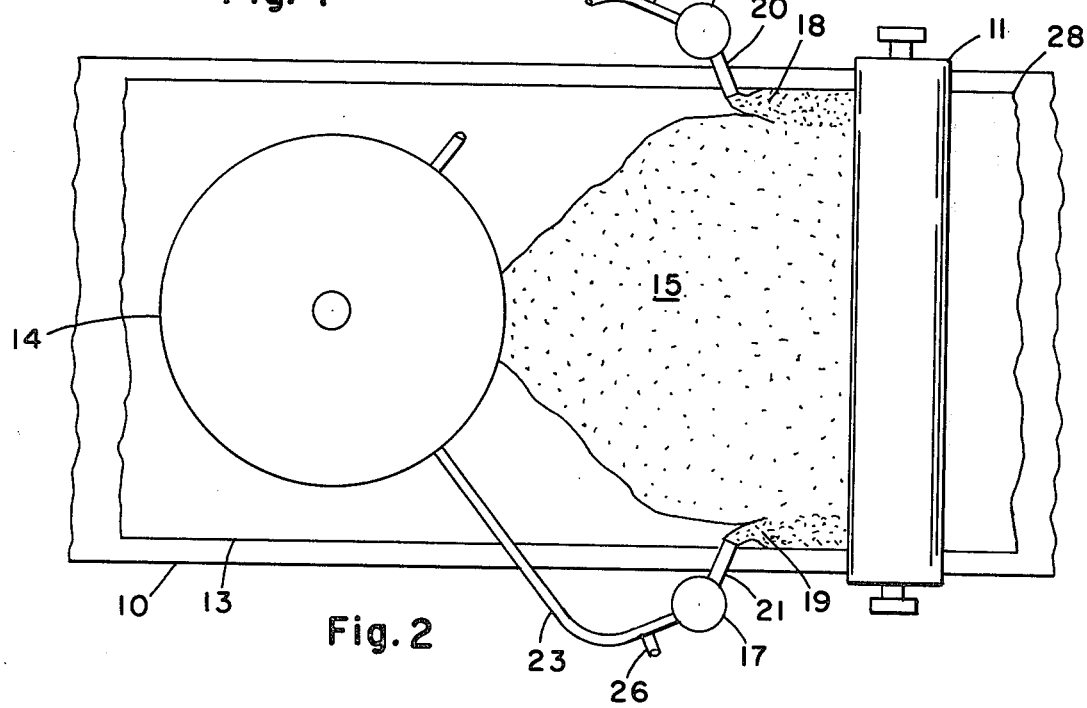

HARD-EDGE WALLBOARD

This invention relates to a method of providing high quality edges on gypsum wallboard in a more economical, and a more energy-efficient way.

In the Teale U.S. Pat. No. 2,762,738, methods are described for providing a gypsum wallboard unitary monolithic core having edge portions of greater density than the main central portion of the monolithic core; which is also an object of the present invention. The Teale patent describes a preferred embodiment in which a pair of relatively small auxiliary mixers each deposit a stream of mixed gypsum slurry which is the same, as to ingredients and proportions, as the main stream of gypsum slurry from a main mixer, excepting only that the foam or foaming agent is omitted.

In addition to this description of a preferred embodiment, the Teale patent further vaguely refers to eliminating the cellular nature of the board at its edge portions, and in this respect the means of accomplishing this, as described, is to deposit all of the cementitious slurry on a paper facing sheet in a foamed state and then subsequently eliminate the foam from the edge portions of the deposit by agitation, the use of defoaming agents, or otherwise.

Subsequent to the Teale patent, it became common to divert a portion of the foamed gypsum slurry from a main mixer into one or two small mixers whereat the foamed mix was subjected to a high speed rotary agitator which caused the foamed slurry to become relatively denser. This denser material was then deposited along the edges of the wallboard core being formed. Considerable energy is required by this method of mechanically decreasing the amount of foam in the slurry.

The present invention involves reducing the speed of such rotary agitators a very substantial degree, to a speed such that the agitation breaks down and dissipates a lesser portion of the foam present, and adding a defoaming agent to the portion of the foamed gypsum slurry being diverted into the small mixers. The agitators will function to distribute the defoaming agent reasonably uniformly throughout this portion of gypsum slurry being deposited along the edges of the wallboard core being formed.

The relatively dense slurry, defoamed to a substantial degree by the novel use of defoamer in a separate small mixer prior to depositing it on the wallboard facing sheet, is a markedly more controllable, improved flowing slurry as compared to prior dense slurries defoamed by mechanical agitation. These more controllable slurries can thus be formed with a more uniform width in the edge of the wallboard, providing many benefits.

This method of forming a relatively more dense edge is markedly more uniform and controllable than depositing a uniform foamed slurry across the full width of the board and then attempting to eliminate foam from the edge portions by agitation or the use of defoaming agents, as suggested by the Teale patent.

One reason for it making a more uniform and controllable slurry than the prior mechanical breaking down of foam prior to depositing is that the prior method resulted in over accelerating the core mix setting action, resulting in a gradual buildup of set gypsum in the outlet hoses which resulted in frequent stoppage of material flow and variable core density, water to gypsum ratio, effecting variations in board drying and quality. Eliminating or decreasing mechanical breakdown of foam avoids this accelerating effect.

It is an object of the invention to provide a novel means for preventing overcalcination and/or underdrying of the edges of gypsum wallboard while in a wallboard dryer, thus avoiding soft edges, wet edges and cupped tapers.

It is a further object to provide a method of increasing wallboard edge densities with substantially lower energy requirements.

It is a still further object to provide a method of increasing wallboard edge densities with less operating problems and less maintenance required.

It is a still further object to provide a method of providing improved wallboard edge quality without varying the water to gypsum ratio of the edge portion during manufacture.

These and other objects and advantages of the invention will be more readily apparent when considered in relation to the preferred embodiments as set forth in the specifications and shown in the drawings in which:

FIG. 1 is a fragmentary, somewhat schematic side elevational view of a continuous wallboard machine which is generally conventional in construction and arrangement but is adapted to perform one form of the present invention;

FIG. 2 is a top plan view of the apparatus of FIG. 1;

FIG. 3 is a cross-section through the edge portion of a section of gypsum wallboard made by the method of the present invention; and FIG. 4 is an enlarged perspective view with portions broken away of an agitator for mixing defoaming agent into a portion of the foamed gypsum slurry.

Referring to FIGS. 1 and 2, there is shown a standard continuously moving conveyor 10 of a gypsum wallboard machine, upper master roll 11, lower master roll 12, and a lower wallboard cover paper facing sheet 13, being conveyed along on conveyor 10. A main mixer 14 deposits a stream of mixed calcined gypsum, water and foam on sheet 13 in the usual manner.

In conventional wallboard manufacture, at least in one common mode of procedure, the side edges of lower facing sheet 13 are turned up at acute or right angles, preferably but not necessarily before sheet 13 arrives at the main mixer 14. Subsequently, and commonly just before the sheet reaches the master rolls, these upstanding edge portions of sheet 13 are turned inwardly over the top of the deposited core and immediately thereafter a top cover sheet is applied just as the facing sheet 13 and the deposited core reach and begin to pass between the master rolls.

These instrumentalities for effecting the upfolding and the infolding of the facing sheet 13 are entirely conventional and, since they do not affect the principles of the present invention, they are not illustrated in the drawing.

Mixer 14 may be a ball mixer, a pin mixer, a combination of both, or of any other suitable type. In FIGS. 1 and 2, mixer 14 is shown schematically as depositing a single relatively wide stream of slurry designated 15. In actual practice, a common expedient is to deposit several separate streams across the table, the plastic streams merging by lateral gravitational flow before reaching the master rolls.

A pair of relatively small slurry agitators 16 and 17 are shown disposed just below the main mixer 14, between the main mixer 14 and the master rolls 11 and 12. Agitators 16 and 17 are shown depositing streams 18, 19 of mixed slurry through chutes 20, 21, each along one marginal edge of the main stream or body of slurry 15. In the alternative, a single small slurry agitator, located wherever convenient, may be provided with two discharge openings or a single discharge opening with two chutes or spouts 20 and 21 for depositing the two edge streams.

The agitators 16 and 17 receive gypsum slurry from main mixer 14 through hoses 22, 23. Feed pipes 25, 26 feed defoaming agent into the agitators 16, 17, closely adjacent the entering gypsum slurry.

The gypsum slurry from main mixer 14 contains a substantial amount of foam as it becomes mixed with the defoaming agent, in agitators 16 and 17. The defoaming agent acts immediately to counteract the foaming agent in the slurry. As the slurry proceeds from the agitators 16 and 17 down the chutes or spouts 20 and 21, it gives up much of the contained air within it, becoming progressively denser.

Considering the lengthwise direction of the apparatus of FIGS. 1 and 2, the agitators 16 and 17 need not be located as there shown, but may be closer to the main mixer 14 and, in fact, may be to the left of main mixer 14 as viewed in FIGS. 1 and 2, so that the side streams of slurry 18 and 19 are deposited in advance of the deposit of the main stream 15.

The upstanding edges of the facing sheet 13 are folded in over the deposited slurry between the agitators 16 and 17 by conventional means not shown and an upper paper facing sheet 27 is applied over the slurry streams 15, 18 and 19 and over the inturned edges of facing sheet 13 at the master rolls 11 and 12 in a conventional manner. The subsequent apparatus and operation of the entire wallboard machine is entirely conventional in the manner in which the boards are dried and cut to length.

However, because of the greater density of the gypsum and water mix at the board edges, the drying rate along such edges is retarded so that, despite the greater surface exposure and the fact that the boards are usually thinner along their side edges, the drying rate at such edges is as slow as in the main cellular body of the board and preferably even slower, whereby there is no recalcination of the gypsum at the board edges. In the form of the invention here described, the superior quality and strength of the board edges is due jointly to the greater density at such edges and the added strength arising directly therefrom, as well as to the greater strength which arises from the fact that the slurry at the edges, by the retardation of its drying forms a fully set body of completely hydrated calcium sulphate.

In the general method of wallboard manufacture referred to herein by way of example, the wallboards are fabricated with their front or outer faces down so that lower facing sheet 13 is the front facing sheet of the ultimate wallboard or panel, as appears from a consideration of FIG. 3 which shows one side edge portion of such a wallboard in cross-section. It will be noted from FIG. 3 that the slurries 15, 18 and 19 form a single monolithic core of the same set cementitious material, although the edge portions thereof, as at 19, are denser and harder than the cellular central portion indicated at 15 in FIG. 3.

A preferred defoaming agent to be combined with the foamed slurry of gypsum, in agitators 16 and 17, is Nopco 9201-A, a trademark of Diamond Shamrock Corp. for a hazy amber blend of mineral oil and non-ionic surfactants. Any of the other known defoaming agents, such as PAG-188, a trademark of PG Consultants Inc., for a blend of mineral oils and silica derivatives, Foamkill S-639, a trademark of Crucible Chemical Co., for hydrophobic silica dispersed in aliphatic hydrocarbons, Mazola corn oil, or others, should be suitable for use in the invention. Numerous defoaming agents for diverse uses are discussed in Chapter 15 of Reinhold Publishing Corporation's text on Foams: Theory and Industrial Applications, by Bikerman, published in 1953.

Agitators 16 and 17, which may be equipment previously used at about 4000 R.P.M. to knock out foam as foamed gypsum is fed through it, may be used in the present invention with the speed lowered to about 1000 R.P.M., a speed at which, without defoaming agent, substantially no foam would be knocked out. At about 1000 R.P.M., the defoaming agent, added as the foamed gypsum enters the agitators 16 and 17, is sufficiently intermixed throughout the entering foamed gypsum slurry to perform its defoaming function prior to becoming finally embodied as the material to form the edge portions of the core of the wallboard.

Using the Nopco 9201-A defoaming agent, during manufacture of tapered hard edge board of ½" nominal thickness, four feet wide, ⅜ pound of defoamer per thousand square feet of board, mixed at 1200 R.P.M., produced a three-inch wide dense edge strip on each edge of the board having a desired density of 457 grams, compared to the central core material being 386 grams, per 3"×3" cylinder of set core material, or a relative increased density of 17% for the slurry both in a wet or dry state.

The above-described agitator speeds are not critical, other than that with the use of a defoaming agent, the energy required to mix in the defoaming agent will be substantially less than the energy required to mechanically cause the loss of foam when no defoaming agent is present.

The benefits of the invention can also be obtained, with possibly some advantages over the above example depending on economics which, understandably are variable, by lowering the agitator speed so that, by agitation alone, only about 40% of the amount of defoaming desired, is obtained, with the balance of the defoaming attained by the novel addition of a defoaming agent in the agitator. Using the Nopco 9201-A defoaming agent, with an agitator rotating at 2500 R.P.M., in manufacturing tapered edge, ½"×4' board, ⅜ pound of defoamer per thousand square feet of board produced a three-inch wide dense edge strip on each edge of the board having a desired density of edge ratio to central density, substantially equal to the densities of the above example.

A suitable form of agitator 16, 17 is shown in cross-section in FIG. 4. Agitator 16 consists of a hollow cylindrical body 30 having an inlet 31 at one end and an outlet 32 at the opposite end. An entirely closed cylindrical body 30 has a length which is about equal to the body radius, for example about three inches. Agitation of material passing through the hollow cylindrical body 30 is accomplished by a multi-paddle wheel 33 with a shaft 34 which extends through the wall of cylindrical body 30. Paddle 33 and shaft 34 are rotatably driven by a motor 35, preferably a variable drive having a speed of about 1000–3000 R.P.M.

The standard form of gypsum wallboard 28 is four feet wide and having a thickness of ⅜ to ⅝ inch. Normally the wallboard edge is tapered, with the edge of the board thinner than the center of the board, as shown in FIG. 3. The side streams of slurry 18 and 19 are each preferably about two to three inches wide, however as little as about ½ inch, if it could be kept uniform, could be effective in providing the benefits sought in making hard edges. With a tapered portion which is two inches wide, a two-inch wide stream of higher density is advantageous. The degree of defoaming accomplished by the invention is not critical; however, an increase in density by defoaming of about 10% will produce a wallboard of significant superiority to a wallboard having uniformly foamed core throughout.

It will be understood that with different strength defoamers, different amounts will be required than described above to obtain equal results. Similarly, with a different construction of mixer, substantially different speed ranges may be found desirable.

Having completed a detailed disclosure of the preferred embodiments of our invention so that those skilled in the art may practice the same, we contemplate that variations may be made without departing from the essence of the invention or the scope of the appended claims.

We claim:

1. In a method of manufacturing gypsum wallboard which comprises depositing a central stream of foamed plastic gypsum on a table and depositing separate streams of relatively unfoamed plastic gypsum along opposite sides of the central stream, leveling the combined streams to form a single flat slab, and drying to produce a unitary monolithic core having edge portions of greater density than the main central portion of the monolithic core, the improvement wherein said separate streams of relatively unfoamed plastic gypsum are formed by diverting a portion of foamed plastic gypsum to at least one agitator and admixing a defoaming agent with said diverted portion prior to agitating said diverted portion, whereby said agitator thoroughly disposes said defoaming agent throughout said diverted portion, causing an increase in density thereof.

2. The method of claim 1 wherein said defoaming agent is an oily material.

3. The method of claim 1 wherein said agitator performs a sufficiently minimal amount of work on said diverted portion such that without said defoaming agent, defoaming is less than 50% completed.

4. The method of claim 1 wherein said agitator is located closely adjacent an outlet from a mixer forming said central stream of foamed plastic gypsum, and said diverted portion is fed from said agitator through chutes wherein said defoamer acts to defoam said plastic gypsum.

5. The method of claim 3 wherein said defoaming agent and said agitation causes an increase in density of said unfoamed plastic gypsum when dried of at least 10% relative to said foamed plastic gypsum when dried.

* * * * *